United States Patent
Litwinowicz et al.

(10) Patent No.: US 10,017,263 B2
(45) Date of Patent: Jul. 10, 2018

(54) MODEL BASED CONTACT PREDICTOR

(71) Applicant: Sikorsky Aircraft Corporation, Stratford, CT (US)

(72) Inventors: Anthony Litwinowicz, Derby, CT (US); Kwok Cheng, Shelton, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 0 days.

(21) Appl. No.: 15/422,941

(22) Filed: Feb. 2, 2017

(65) Prior Publication Data

US 2017/0291711 A1 Oct. 12, 2017

Related U.S. Application Data

(60) Provisional application No. 62/321,047, filed on Apr. 11, 2016.

(51) Int. Cl.
| | |
|---|---|
| *G05D 1/00* | (2006.01) |
| *B64D 25/00* | (2006.01) |
| *B64C 25/00* | (2006.01) |
| *B64D 45/00* | (2006.01) |
| *B64C 27/04* | (2006.01) |

(52) U.S. Cl.
CPC .............. *B64D 25/00* (2013.01); *B64C 25/00* (2013.01); *B64D 45/00* (2013.01); *B64C 27/04* (2013.01); *B64D 2201/00* (2013.01)

(58) Field of Classification Search
USPC .......................................................... 701/3
See application file for complete search history.

(56) References Cited

U.S. PATENT DOCUMENTS

| | | | |
|---|---|---|---|
| 5,892,462 A | 4/1999 | Tran | |
| 7,073,752 B2* | 7/2006 | Voronka | B64D 17/56 244/149 |
| 8,588,996 B2 | 11/2013 | Hill et al. | |
| 9,108,582 B1 | 8/2015 | Kizloski et al. | |
| 9,156,540 B2 | 10/2015 | Litwinowicz et al. | |
| 2006/0091653 A1* | 5/2006 | De Mersseman | B60R 21/013 280/735 |
| 2006/0250297 A1* | 11/2006 | Prakah-Asante | B60R 21/0134 342/70 |
| 2007/0007384 A1* | 1/2007 | Sliwa, Jr. | B64D 45/0015 244/30 |
| 2007/0145193 A1* | 6/2007 | Hakki | B64D 17/80 244/139 |
| 2008/0114506 A1 | 5/2008 | Davis et al. | |
| 2008/0119993 A1* | 5/2008 | Breed | B60R 19/205 701/46 |

(Continued)

*Primary Examiner* — Tyler Paige
(74) *Attorney, Agent, or Firm* — Cantor Colburn LLP

(57) ABSTRACT

An impact mitigation system for an aircraft and method of deploying the impact mitigation system is disclosed. A state parameter of the aircraft is obtained. The state parameter is used with an aircraft performance model to determine an acceleration capability of the aircraft. A trajectory of the aircraft is predicted using the state parameter of the aircraft and the acceleration capability of the aircraft. A location of an object with respect to the aircraft is determined and the impact mitigation system is deployed when the predicted trajectory indicates a contact with the object at a predicted contact velocity higher than a threshold velocity at a future time.

15 Claims, 3 Drawing Sheets

(56) References Cited

U.S. PATENT DOCUMENTS

| | | | |
|---|---|---|---|
| 2009/0212160 A1* | 8/2009 | Beauchamp | B64D 25/10 244/122 AG |
| 2011/0204181 A1* | 8/2011 | Hill | B64D 25/00 244/100 A |
| 2011/0276217 A1 | 11/2011 | Sim et al. | |
| 2012/0101666 A1* | 4/2012 | Hill | B64D 25/00 701/3 |
| 2013/0068883 A1* | 3/2013 | Lu | B64C 27/006 244/100 A |
| 2015/0039159 A1* | 2/2015 | Litwinowicz | B64C 19/00 701/3 |
| 2015/0041584 A1* | 2/2015 | Lu | B64D 25/00 244/100 A |
| 2015/0239554 A1 | 8/2015 | Birchette et al. | |

\* cited by examiner

MODEL BASED CONTACT PREDICTOR

CROSS REFERENCE TO RELATED APPLICATIONS

The present invention claims priority from U.S. Provisional Application Ser. No. 62/321,047, filed Apr. 11, 2016, the contents of which are incorporated herein by reference in their entirety.

STATEMENT OF FEDERAL SUPPORT

This invention was made with government support with the United States Army under Contract No.: W911W6-12-2-0005. The government therefore has certain rights in this invention.

BACKGROUND OF THE INVENTION

The present invention is directed to a method and apparatus for mitigating the effects of contact of aircraft with objects and, in particular, to predicting when an aircraft will come in contact with an object in order to deploy systems to manage the impact.

Aircrafts such as helicopters employ various mitigation devices that reduce the effects of high-speed contact with objects in order to ensure the safety of aircraft crew. Some of these mitigation devices include tightening of crew restraints, deploying landing gear, and deploying internal and external airbags. While devices such as internal airbags can be deployed at a moment of impact, devices such as external airbags must be deployed prior to the moment of impact. An impact prediction system is therefore useful in order to trigger deployment of the external airbags and other pre-contact mitigation devices. In order to prevent false deployment of these mitigation devices, such as during a scenario in which the aircraft is performing a safe landing, the impact prediction system must be highly robust.

SUMMARY OF THE INVENTION

According to one embodiment of the present invention, a method of deploying an impact mitigation system for an aircraft, including: obtaining a state parameter of the aircraft; determining an acceleration capability of the aircraft using the state parameter and an aircraft performance model; predicting a trajectory of the aircraft using the state parameter of the aircraft and the determined acceleration capability of the aircraft; determining a location of an object with respect to the aircraft; and deploying the impact mitigation system when the predicted trajectory indicates a contact with the object at a future time.

According to one embodiment of the present invention, an impact mitigation system for an aircraft, including: a state sensor for obtaining a state parameter of the aircraft; a surveillance sensor for determining a location of an object with respect to the aircraft; and a processor configured to: determine an acceleration capability of the aircraft using the state parameter and an aircraft performance model, predict a trajectory of the aircraft using the state parameter of the aircraft and the acceleration capability of the aircraft, and deploy the impact mitigation system when the predicted trajectory indicates a contact with the object at a future time.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

An impact mitigation system of the present invention runs a flight prediction model that utilizes aircraft state data including vertical speed, altitude, three-dimensional terrain data, airspeed, attitude, mass, power available, and a rotor thrust model, among others, to predict when a contact of the aircraft with an object is imminent. In order to avoid false deployments of the impact mitigation system, the model assumes the pilot will take some action at the last minute to avoid the contact or lessen the effects of the contact. The model therefore employs knowledge of the aircraft's performance capabilities so that a best case scenario of a flight trajectory can be predicted. When the best case scenario shows that an undesirable contact can no longer be avoided by the pilot, one or more impact mitigation devices are deployed.

The performance capabilities of the aircraft can vary greatly based on the effects of inflow, ground effect, forward speed, rotor speed, and power. By including these varying parameters into calculations, the present invention provides a model for flight prediction that reflects the current state of the aircraft. For example, a maximum thrust capability of the aircraft may be greater at high speeds than at low speed. Thus, knowing whether the aircraft is in high velocity flight or in a hover condition allows a flight trajectory to be predicted based on the available thrust capabilities rather than, for example, a maximum thrust capability. The present invention can be implemented as an integrated piece of a fly-by-wire (FBW) control system to take advantage of shared sensing capabilities.

Figure 1:
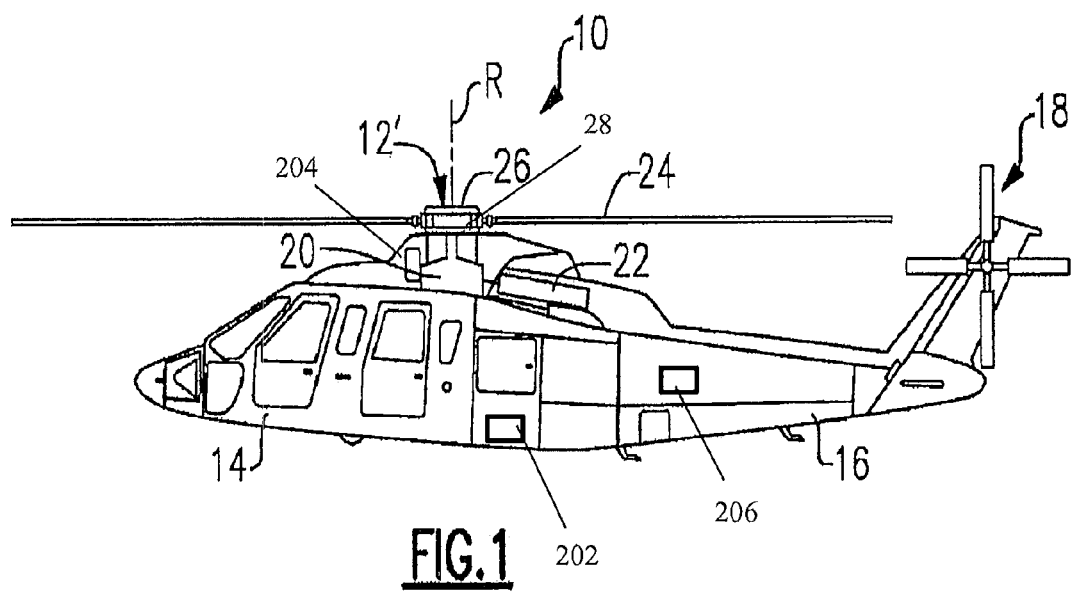
FIG. 1 schematically illustrates a rotary wing aircraft in accordance with one embodiment of the present invention.

Referring now to the Figures, where the invention will be described with reference to specific embodiments, without limiting same, FIG. 1 schematically illustrates a rotary wing aircraft 10 having a main rotor assembly 12. The aircraft 10 includes an airframe 14 having an extending tail 16 which mounts a tail rotor assembly 18, such as an anti-torque system, a translational thrust system, a pusher propeller, a rotor propulsion system, and the like. The main rotor assembly 12 is driven about an axis of rotation R through a gearbox (illustrated schematically at 20) by one or more engines 22. The main rotor assembly 12 includes multiple rotor blades 24 mounted to a rotor hub 26, and a swashplate 28 that is used to affect a state or orientation of the rotor blades 24. Although a particular helicopter configuration is illustrated herein and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from embodiments of the invention. Flight control surfaces can include servos, individual blade control actuators, on-blade flaps and/or slats, tail rotors, propellers, etc. Actuators of various types can be used in different embodiments of the aircraft. Some actuators may include: rockets, magneto/plasma thrusters, momentum-reaction wheels, control moment gyroscopes, nutation dampers, solar radiation pressure actuators, rotary pulse generators, and magnetic torquers. In various embodiments, the aircraft 10 can be flown either in a ground control mode or in a model following control mode.

The aircraft 10 may include various state sensors 202, for measuring various state parameters with respect to the aircraft. For example, sensors may measure aircraft velocities, such as vertical and horizontal velocities, and aircraft attitude, altitude, aircraft weight or mass, outside air pressure, outside air temperature, etc. Additional state sensors 204 may measure aircraft engine performance parameters, such as engine speed, air intake velocities, intake air density and humidity, etc. Surveillance sensors 206 may be used to survey a local ground terrain in order to locate objects with respect to the aircraft. The rotary wing aircraft 10 comes equipped with various impact mitigation devices that provide for the safety of passengers and crew as well as to prevent structural damage to the aircraft. Exemplary impact mitigation devices may include, but are not limited to, external airbags, landing gear, internal restraints, internal airbags, etc.

Figure 2:
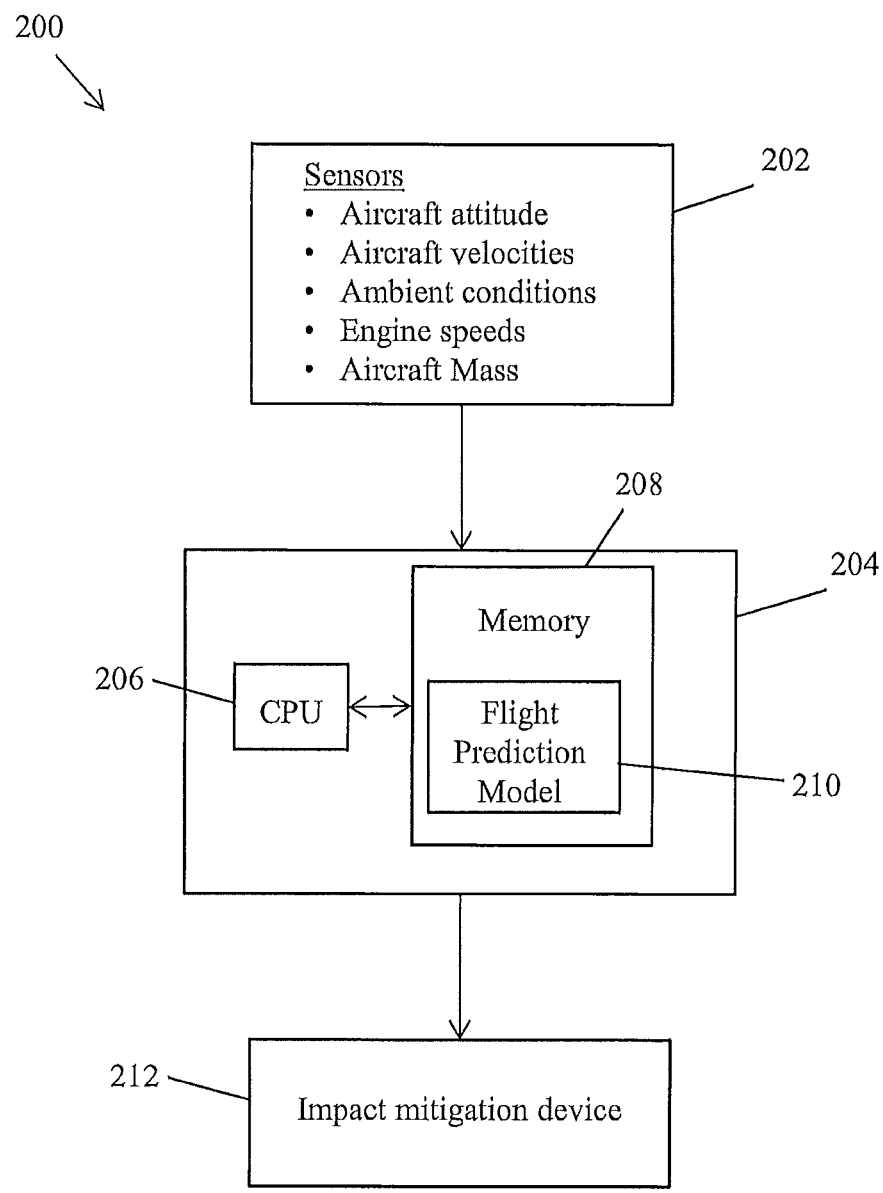
FIG. 2 shows a schematic diagram of an impact mitigation system for predicting a contact of the aircraft with an object and for deploying a device the mitigates the effects of the predicted contact.

FIG. 2 shows a schematic diagram of an impact mitigation system 200 that predicts a flight trajectory of the aircraft and deploys impact mitigation devices at appropriate times. The impact mitigation system 200 includes sensors 202 for measuring an aircraft state parameter that can be used in determining a future flight path or trajectory of the aircraft, a flight control unit 204 that predicts the trajectory of the aircraft based on the measured aircraft state parameter, and an impact mitigation device 212 that can be deployed when the flight control unit 204 predicts an impact at a future time. The sensors 202 measure the aircraft state parameters disclosed above which includes, but are not limited to, an attitude of the aircraft, a velocity of the aircraft, aircraft mass, ambient atmospheric conditions, such as air density, air humidity, etc., and engine performance parameters. These state parameters can be used in a flight prediction model 210 operated at the flight control unit 204 to predict aircraft trajectory and, if necessary, to deploy the impact mitigation device 212. The flight control unit 204 includes a processor 206 and a memory 208 that stores the flight prediction model 210 according to one embodiment of the present invention. The processor 206 processes, executes or runs the flight prediction model 210 using the measured state parameters in order to predict a trajectory (i.e., spatial location and velocities at a future time) of the aircraft and a possible contact of the aircraft with an object or terrain feature. In one embodiment, the processor 206 running the flight prediction model 210 compares the trajectory of the aircraft to a terrain or terrain model in order to predict the impact. When a contact scenario is predicted as being unavoidable, the processor 206 can send a signal to deploy the impact mitigation device 212.

Figure 3:
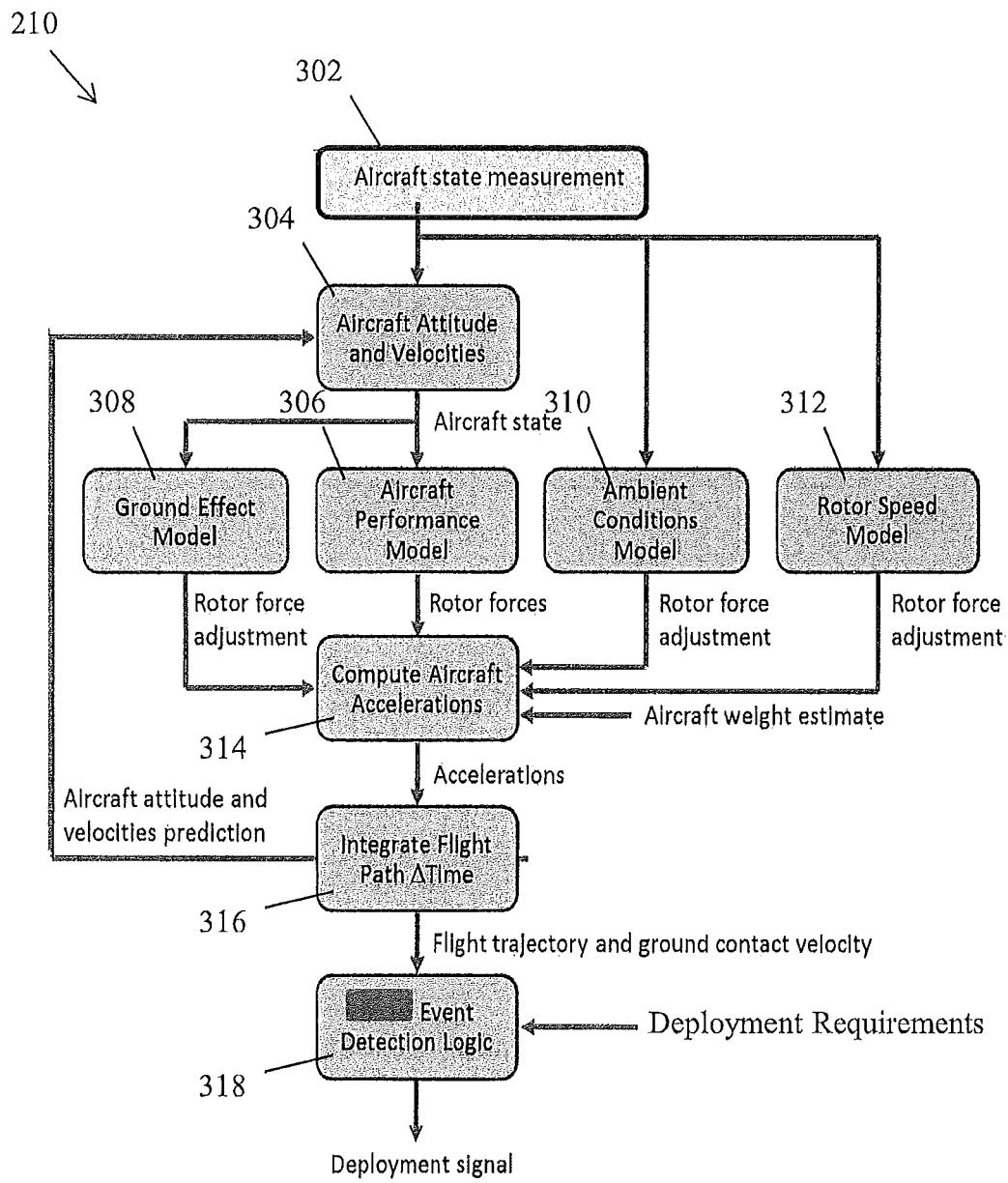
FIG. 3 shows a schematic diagram of a flight prediction model in accordance with one embodiment of the present invention.

FIG. 3 shows a schematic diagram 300 of the flight prediction model 210 of the present invention. The flight prediction model 210 is composed of various modules that perform calculations that are usable in order to predict whether an aircraft is capable of avoiding contact with an object at a predicted speed that causes structural damage to the aircraft and/or affect the safety of the aircraft crew and passengers. One set of these modules (i.e., modules 306, 308, 310 and 312) may form a rotor thrust model to predict thrust capabilities aircraft based on rotor speed, ground effect, vertical speed, and longitudinal speed, ambient conditions, and engine power, for example. These estimated forces are used to estimate an acceleration capability or a best case acceleration of the aircraft. The estimated acceleration capability of the aircraft is used along with measured aircraft velocities, spatial location, attitudes and other suitable parameters to estimate a best case trajectory of the aircraft at a selected time in the future. The estimated trajectory is then compared with a local terrain in order to predict the possibility of the aircraft making contact with an object or terrain feature within the selected time duration. When a contact is determined to be unavoidable at a predicted speed that causes structural damage to the aircraft and/or affect the safety of the aircraft crew and passengers at the future time, impact mitigation devices are deployed. A detailed description of the flight prediction model 210 is provided below.

In one embodiment of the flight prediction model 210, aircraft state parameter measurements 302 are received from sensors 202 and are input to various modules 306, 308, 310 and 312 in order to determine forces on the aircraft. State parameters such as aircraft attitude and aircraft velocities are sent by the attitude and aircraft velocities module 304 to an aircraft performance module 306 and a ground effect module 308. The aircraft performance module 306 uses the aircraft attitude and aircraft velocities as input to an aircraft performance model and determines a rotor force or rotor thrust of the aircraft. The ground effect module 308 determines the ground effect force on the aircraft due to the proximity of the aircraft to the ground or to a surface of the terrain. State parameters such as ambient atmospheric parameters (e.g., air density, air humidity, etc.) are provided as input into an ambient conditions module 310 which determines a rotor force adjustment due to the ambient or atmospheric conditions. These atmospheric conditions can affect the ability of a rotor to provide thrust for the aircraft. State parameters such as engine speed are input into a rotor speed module 312 which calculates a rotor force adjustment based on engine requirements and capabilities. As an example, the ability of the rotor to add lift to the aircraft may be limited when the engines either are not turning the rotor at full speed or are not capable of maintaining rotor speed.

The forces calculated from the aircraft performance module 306, ground effect module 308, ambient conditions module 310 and rotor speed module 312 are provided to an aircraft acceleration module 314. The aircraft acceleration module 314 sums the forces provided from the aircraft performance module 306, ground effect module 308, ambient conditions module 310 and rotor speed module 312 to provide a predicted thrust $F_{pred}$ on the aircraft. The aircraft acceleration module 314 further receives as input an estimate of a mass M of the aircraft, which can include the mass of passengers as well as mass of the aircraft. The aircraft acceleration module 314 can then calculate an acceleration A of the aircraft using the predicted thrust $F_{pred}$, the mass of the aircraft M, and Newton's second law of motion: $F_{pred} = MA$.

The aircraft acceleration module 314 provides the calculated acceleration of the aircraft to a flight path integration module 316. The flight path integration module 316 integrates the acceleration and aircraft velocities to estimate or predict a location and velocity of the aircraft at a selected time, such as 1 or 2 seconds into the future. This selected time duration is divided into a selected number of time intervals. Velocities and locations are calculated for each time interval in order to predict location and velocity at the selected future time. This integration method is described with respect to the example discussed below in which, for illustrative purposes only, the time duration chosen as a one-second time duration and the selected number of time intervals is 100 time intervals (each time interval is $\frac{1}{100}$ of a second). At the beginning of the integration, the calculated acceleration of the aircraft, as well as measured velocities and spatial parameters, are provided to the flight path integration module 316. The flight path integration module 316 then calculates velocities and location of the aircraft at the end of the first $\frac{1}{100}$ of a second. These predicted velocities and locations can then be provided back at aircraft attitude and velocities module 304 to estimate forces on the aircraft during the second time interval (i.e., the second $\frac{1}{100}$ of a second). The acceleration due to these forces is then used at the flight path integration module 316 to determine the velocities and spatial locations at the end of the second time interval. This procedure can be repeated over all 100 of the time intervals so that location and trajectory of the aircraft is calculated or predicted at one second into the future.

The impact prediction model 210 can be run iteratively at the processor 206 in order to provide a prediction of aircraft trajectory that is updated multiple times within the selected time duration. For example, a first instance of the impact prediction model 210 may be run starting at time t=0 using sensor measurements obtained at time t=0 in order to compute aircraft trajectory at t=0.01 second. Then, the impact prediction model 210 may be run starting at time t=0.01 seconds using the predicted measurements obtained for time t=0.01 seconds in order to compute predicted aircraft trajectory at t=0.02 second. In this way, a time resolution of the aircraft trajectory prediction is increased.

Once the location and velocity of the aircraft has been predicted at a future time, event detector module 318 determines whether contact with an object or terrain feature is unavoidable. The event detector module 318 compares the predicted location and velocity to a ground terrain model, generally a three-dimensional ground terrain model. The ground terrain model may be determined using three-dimensional terrain sensors disposed on the aircraft. The event detector module 318 performs a contact query using the flight trajectory to determine if the aircraft will be no longer able to avoid contact with an object or with the ground terrain at the future time and, if so, to determine or forecast an expected ground contact velocity of the aircraft with the object. In one embodiment, the trajectory calculations are used to determine a trajectory envelope for the aircraft that indicates a best-case scenario based on the capabilities of the aircraft.

When the trajectory envelope does not intersect with an obstacle or terrain feature, the pilot is capable of performing an action to avoid the obstacle or terrain feature. When the trajectory envelope intersects with an obstacle or terrain, contact with the obstacle or terrain is determined to be imminent and/or unavoidable.

Velocities are also used to determine whether to deploy the impact mitigation devices 212. Although contact with an object may be predicted, such a contact may be considered desirable, such as when the contact is indicative of a safe landing of the aircraft on the ground. Since safe landings occurs at generally low speeds, a threshold velocity can be selected that determines whether the contact with the ground is indicative of a landing of the aircraft. If a predicted contact velocity is above the threshold velocity for a safe landing, the event detector module 318 determines that an event is about to occur that requires contact mitigation and sends a deployment signal to an impact mitigation device (212, FIG. 2) so that they can be properly deployed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method of deploying an impact mitigation system for an aircraft, comprising:
   obtaining a state parameter of the aircraft;
   determining an acceleration capability of the aircraft using the state parameter and an aircraft performance model;
   predicting a trajectory of the aircraft using the state parameter of the aircraft and the acceleration capability of the aircraft;
   determining a location of an object with respect to the aircraft; and
   deploying the impact mitigation system when the predicted trajectory indicates a contact with the object at a future time.

2. The method of claim 1, further comprising using the state parameter and a rotor thrust model of the aircraft performance model to determine a rotor thrust capability of an engine of the aircraft and determining the acceleration capability of the aircraft from the rotor thrust capability.

3. The method of claim 2, further comprising determining the acceleration capability of the aircraft from the rotor thrust capability and a mass of the aircraft.

4. The method of claim 2, wherein determining the rotor thrust capability includes at least one of: (i) determining a force provided by a rotor of the aircraft; (ii) determining a force on the aircraft due to ground effect; (iii) determining an effect of atmospheric conditions on the force provided on the aircraft; and (iv) determining a force adjustment based on an engine capabilities and rotor speed.

5. The method of claim 1, further comprising performing an integration using the determined acceleration capability and the state parameter to predict a trajectory envelope of the aircraft.

6. The method of claim 1, further comprising comparing the predicted trajectory envelope of the aircraft to a model of a terrain to predict an unavoidable contact of the aircraft with a feature of the terrain.

7. The method of claim 6, further comprising predicting a contact velocity of the aircraft and deploying the impact mitigation system when the predicted contact velocity exceeds a threshold velocity.

8. The method of claim 1, wherein the state parameter further comprises at least one of: (i) an attitude of the aircraft; and (ii) a velocity of the aircraft.

9. The method of claim 1, wherein the deploying the impact mitigation system includes at least one of: (i) deploying an external airbag; and (ii) deploying a landing gear.

10. An impact mitigation system for an aircraft, comprising:

a state sensor for obtaining a state parameter of the aircraft;

a surveillance sensor for determining a location of an object with respect to the aircraft; and a processor configured to:
  determine an acceleration capability of the aircraft using the state parameter and an aircraft performance model,
  predict a trajectory of the aircraft using the state parameter of the aircraft and the acceleration capability of the aircraft, and
  deploy the impact mitigation system when the predicted trajectory indicates a contact with the object at a future time.

11. The aircraft of claim 10, wherein the processor determines a rotor thrust capability of an engine of the aircraft using the state parameter of the aircraft and a rotor thrust model of the aircraft performance model and determines the acceleration capability of the aircraft from the rotor thrust capability.

12. The aircraft of claim 11, wherein the processor is further configured to determine the rotor thrust capability by determining at least one of: (i) a force provided by a rotor of the aircraft; (ii) a force on the aircraft due to ground effect; (iii) an effect of atmospheric conditions on the force provided on the aircraft; and (iv) a force adjustment based on a capability of an engine and a rotor speed of the aircraft.

13. The aircraft of claim 10, wherein the processor further predicts a contact velocity of the aircraft and deploys the impact mitigation device when the predicted contact velocity exceeds a threshold velocity.

14. The aircraft of claim 10, wherein the state parameter further comprises at least one of: (i) an attitude of the aircraft; and (ii) a velocity of the aircraft.

15. The aircraft of claim 10, wherein the impact mitigation device includes at least one of: (i) an external airbag; and (ii) a landing gear.

* * * * *